UNITED STATES PATENT OFFICE.

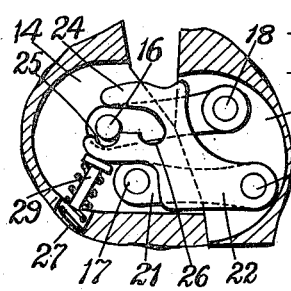

JOHN CARL SCHELTER, OF ROCHESTER, NEW YORK, ASSIGNOR TO FITZ-EMPIRE DOUBLE PIVOT LAST COMPANY, OF AUBURN, MAINE, A CORPORATION OF MAINE.

LAST.

1,423,740.  Specification of Letters Patent.  Patented July 25, 1922.

Application filed December 21, 1918. Serial No. 267,757.

*To all whom it may concern:*

Be it known that I, JOHN CARL SCHELTER, a citizen of the United States, residing at Rochester, in the county of Monroe and State of New York, have invented certain Improvements in Lasts, of which the following description, in connection with the accompanying drawings, is a specification, like reference characters on the drawings indicating like parts in the several figures.

This invention relates to improvements in lasts and refers particularly to that type known as "hinge-lasts."

Collapsible lasts having the fore and heel parts connected by a single hinge, by a single link, by two links, or by other means, are well known, and while some of them include means for locking the last parts in extended positions, they do not prevent relative movement of the parts when in collapsed condition. This interferes with the manipulation of the lasts when placing them in shoes.

It is an important object of my present invention to provide a novel construction of hinge-last which, while having provision for positively locking the parts when the last is extended, and without sacrifice of the important advantages of such construction, will possess the characteristic feature of providing adequately for holding the parts in collapsed position, thereby enabling the last to be conveniently handled and manipulated into the shoe.

Of the accompanying drawings,

Fig. 1 is a longitudinal section of a last the fore and heel parts of which are held positively locked extended by improved devices.

Fig. 2 illustrates the same in collapsed condition.

Fig. 3 is a view similar to Fig. 2, a part of the locking device being broken out better to illustrate a preferred form of cut for the last members.

Figs. 4, 5 and 6 are details to illustrate different relative positions of the connecting links and locking plate as the fore and heel parts are shifted relatively to each other.

The last comprises a forepart 12 and heel part 13 having, respectively, recesses 14 and 15.

Extending transversely of recess 14 are pins 16, 17, and extending transversely of recess 15 are pins 18, 19.

A link 20 connects the pins 16 and 18 and a link 21 connects the pins 17 and 19. If no further mechanism were employed, the fore and heel parts would readily move without opposition between the positions indicated in Figs. 1 and 2. The locking device to prevent free hinge movement comprises a plate 22 pivotally mounted on pin 19 and having a lower arm 23 and an upper arm 24, the lower arm 23 having recesses 25, 26 either one of which is adapted to engage the pin 16.

A spring 27 mounted in a recess 28 in the forepart resiliently holds a pin 29 in contact with the tip of the lower arm 23 of the locking plate.

With the fore and heel parts in the relative positions shown in Fig. 1, the locking plate is held by the spring-pressed pin 29 in such position that the recess 25 embraces sufficient of the pin 16 to cause the plate 22 to act as a strut and positively prevent any movement of the last parts toward collapsed condition. This is because any movement of the last parts toward collapsed condition would bring the pins 16, 19 toward each other as shown by comparing Figs. 1 and 2.

To collapse the last the operator, with one finger or any suitable implement bearing on the arm 24, swings the plate 22 toward the bottom of the last, and continues such pressure on the arm 24 as will cause the pin 16 to entirely clear the recess 25 (see Fig. 5). As soon as the parts have reached the position of Fig. 5, pressure upon the arm 24 need not be continued because the pin 16 is then entirely out of recess 25 and therefore, since the parts are unlocked, they can be readily shifted through the Fig. 6 position to the Fig. 2 position at which time the last is collapsed.

To return the last to extended position, no action is needed other than grasping the forepart (assuming that the heel part is on the jack) and pressing down on said forepart. The recess 26 preferably does not embrace enough of the pin to enable it to act positively as a tie member, and a pull will cause the pin to ride out over the end of the recess 26. As soon as the parts reach the Fig. 5 position on their return, the spring-pressed pin 29 acts upon the toe of arm 23 to carry the parts through the Fig. 4 position to the Fig. 1 position.

From the above, it will readily be understood that although the last parts are positively locked in their relative positions shown in Fig. 1, they will be only yieldingly and resiliently held in their relative positions shown in Fig. 2. This latter is because there is nothing to positively prevent the shifting of the parts from the Fig. 2 position to the positions shown successively in Figs. 6, 5 and 4, and finally Fig. 1. The link and locking mechanism of Fig. 3 is the same as that in Figs. 1 and 2, but said Fig. 3 shows a line of cut between the fore and heel parts different from that in Fig. 2. The cut in both forms consists fundamentally of a short nearly vertical cut 30 extending from the bottom and tipped a little forward, a longer cut 32 tipped still farther forward, followed on the forepart by a cut 34 tipped still farther forward and a cut 36 tipped a little backward from the cut 34; and followed on the heel part by a substantially vertical cut 38. In the form shown in Figs. 1 and 2 the line 30—32—38 on the heel part substantially fits the line 32—34—36 on the forepart. In the form shown in Fig. 3 the angle between 32 and 34 on the forepart is flattened and the angle between 30 and 32 on the heel part correspondingly sharpened so that only the ends of the cuts 30, 32 on the heel part contact with the forepart. The form of cut such as shown in Fig. 3, or analogous thereto, is preferred for the following reason. When two connecting links are employed between the fore and heel parts of a last, it is exceedingly difficult so to form the line of cut that the faces will abut flat in both extended and collapsed conditions. Hence, for convenience of manufacture I prefer to disregard the employment of flat abutting faces such as shown in Figs. 1 and 2 and to form said faces so that there will be a plurality of definitely located contacting points as indicated in Fig. 3.

The recesses 14 and 15 will be conveniently formed by a narrow chain mortiser and are not over ¼ inch wide. The links and locking plate just fill them laterally. The arm 24 of the plate in addition to its unlocking function co-operates with the link 20 to fill the upper parts of the recesses and this renders the last rigid against the torsional stresses of the leveling machine, for example.

It is clear that in extending the last from collapsed position, the operator will meet with a definite resistance of substantially fixed and predetermined value at the outset, owing to the engagement of the pin 16 with the notch 26. As soon as this is overcome and the pin has slipped out of the notch, the last extends easily, only the ordinary friction of the parts being experienced after the first step in the extending movement. The last may thus be said to be "impositively locked" in collapsed position. That is, it is resiliently held in this position and tends to return to it after a slight displacement but can be moved out of it by an adequate force.

Having now described my invention and illustrated a preferred embodiment thereof, although without attempting to illustrate or describe possible modifications thereof, what I claim is:—

1. A hinge-last having a hinge pin and a member engaging therewith for positively locking the last in extended condition and impositively locking it in collapsed position.

2. A hinge-last comprising fore and heel parts having link connections, and a pivoted member on one last part and a fixed member on the other, arranged to engage each other to hold the parts positively when extnded and to lock them impositively when collapsed.

3. A last of the character described comprising fore and heel parts and three members extending between the parts, two of said members being links connecting the fore and heel parts, and the third member being constructed to lock the last positively in extended position and to lock it impositively in collapsed position.

4. A last of the character described comprising fore and heel parts, a pair of links connecting said parts, and a locking plate pivotally connected to one of said parts and extending into the other, means being provided whereby said plate will positively lock the last in one operative position and impositively lock it in another operative position.

5. A last of the character described comprising fore and heel parts each having a pair of pins, a pair of links mounted on said pins, a plate pivotally mounted on one of the pins of the heel part and having a pair of surfaces adapted alternately to engage one of the pins of the fore part, and a spring for holding said plate when one or the other of said surfaces is engaged by said pin of the fore part.

6. A last of the character described comprising fore and heel parts, a pair of links connecting said parts, a locking plate pivotally connected with the heel part and having two arms extending into the fore part, one of said arms having a pair of recesses, means carried by the fore part for engaging one or the other of said recesses, and a spring for holding said plate with one or the other of its recesses engaged as described, the other of said two arms serving to stiffen the last and being arranged to swing the locking plate to unlock the last.

7. A hinge last having two members, one on each last part, constructed and arranged to co-operate to hold the last positively in extended position and yieldingly in collapsed position, one of said members being fixed on its last part and engaging the other said member in different places on the other said member in the extended and collapsed positions, respectively.

In testimony whereof I have signed my name to this specification.

JOHN CARL SCHELTER.